US008665220B2

(12) United States Patent
Steiner et al.

(10) Patent No.: US 8,665,220 B2
(45) Date of Patent: Mar. 4, 2014

(54) SYSTEM FOR SECURING A KEYPAD TO A HOUSING (75) Inventors: Georg Robert Gustav Steiner, Bochum (DE); Ralf Dieter Syldatke, Bochum (DE)

(73) Assignee: Research in Motion Limited, Waterloo, Ontario (CA)

( * ) Notice: Subject to any disclaimer, the term of this patent is extended or adjusted under 35 U.S.C. 154(b) by 250 days.

(21) Appl. No.: 13/246,314

(22) Filed: Sep. 27, 2011

(65) Prior Publication Data
US 2013/0076636 A1 Mar. 28, 2013

(51) Int. Cl.
*G06F 3/02* (2006.01)
*G09G 5/00* (2006.01)

(52) U.S. Cl.
USPC .......................................... 345/169

(58) Field of Classification Search
None
See application file for complete search history.

(56) References Cited

U.S. PATENT DOCUMENTS

| | | | |
|---|---|---|---|
| 4,768,230 A | 8/1988 | Viebrantz et al. | |
| 4,892,981 A | 1/1990 | Soloway et al. | |
| 5,510,953 A | 4/1996 | Merkel | |
| 5,969,644 A * | 10/1999 | Koutaka | 341/22 |
| 6,031,524 A | 2/2000 | Kunert | |
| 6,156,963 A | 12/2000 | Masubuchi et al. | |
| 6,172,620 B1 | 1/2001 | Brick et al. | |
| 6,212,066 B1 * | 4/2001 | Fetterman | 361/679.17 |
| 6,493,215 B1 * | 12/2002 | Chiang et al. | 361/679.08 |
| 6,935,605 B2 | 8/2005 | Giles et al. | |
| 6,944,012 B2 | 9/2005 | Doczy et al. | |
| 7,041,924 B2 | 5/2006 | Jeschke et al. | |
| 7,176,393 B1 | 2/2007 | Lin et al. | |
| 7,603,311 B1 | 10/2009 | Yadav-Ranjan | |
| 7,696,425 B2 | 4/2010 | Oh | |
| 7,733,636 B2 * | 6/2010 | Kobayashi et al. | 361/679.08 |
| 7,751,788 B2 * | 7/2010 | Otani et al. | 455/186.2 |
| 7,772,512 B2 | 8/2010 | Milo | |
| 7,952,562 B2 | 5/2011 | Mundt et al. | |
| 7,990,693 B2 | 8/2011 | Nakajima | |
| 2006/0142074 A1 | 6/2006 | Impio et al. | |
| 2007/0199804 A1 | 8/2007 | Joseph et al. | |
| 2008/0074392 A1* | 3/2008 | Mustafa et al. | 345/167 |
| 2009/0207054 A1 | 8/2009 | Rak et al. | |
| 2010/0220451 A1 | 9/2010 | Zaitz et al. | |

(Continued)

FOREIGN PATENT DOCUMENTS

| | | |
|---|---|---|
| DE | 10 2008 038 567 A1 | 8/2008 |
| EP | 1343646 A1 | 9/2003 |
| EP | 2 106 102 A2 | 3/2009 |
| GB | 1528158 A | 10/1978 |

OTHER PUBLICATIONS

European Search Report dated Mar. 2, 2012, EpP 11 18 3008, filed Mar. 22, 2012.

*Primary Examiner* — Nicholas Lee
(74) *Attorney, Agent, or Firm* — Brinks Gilson & Lione (57) ABSTRACT

An electronic device includes an interlocking mechanism for fixing a keypad to a housing of the device. The housing is coupled with the keypad such that the keys may extend to the edges of the electronic device and the edge keys are secured against being removed from the keypad. The edge keys may include a hook or locking mechanism coupled with the housing to prevent uprooting of the edge keys. Another set of hooks or lockings connect the housing with the keypad to prevent bulging of the keypad and to limit lateral movement between the keys or the keypad with the housing.

18 Claims, 6 Drawing Sheets

(56) References Cited

U.S. PATENT DOCUMENTS

2011/0044013 A1 2/2011 Wei et al.
2011/0069831 A1 3/2011 Pathiyal
2011/0102205 A1 5/2011 Chen

* cited by examiner

SYSTEM FOR SECURING A KEYPAD TO A HOUSING

BACKGROUND

Electronic devices such as cellular phones, smart phones, personal digital assistants, laptop computers, etc. have become increasingly popular among consumers. Many electronic devices have integrated buttons, keyboards, or keypads of one variety or another that allow a user to interface with the device. The keyboard or keypad that is used in portable electronic devices may be referred to as a film-in-plastic (FIP) keypad, also known as an in-mould-decoration (IMD) keypad. FIP or IMD keypads may be difficult to affix in place. For example, certain keys within a keypad may be susceptible to accidentally being pried from the keypad. Also, keypads or certain keys may have lateral movement that causes bulging in the keypad.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

By way of introduction, an apparatus for fixing a keypad to a housing is disclosed. The keypad may be for an electronic device, such as a smartphone, laptop, or other handheld device. The housing of the electronic device is coupled with the keypad such that the keys extend to the edges of the device. The edge keys are secured against being removed from the keypad despite being at the edge of the housing and edge of the device. The edge keys may include a hook or locking mechanism coupled with the housing to prevent uprooting of the edge keys. Another set of hooks or locking mechanisms may connect the housing with the keypad to prevent bulging of the housing and to limit lateral movement of the keys or the keypad with respect to the housing.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Electronic devices may include keys or buttons for receiving inputs. A keypad may include one or more keys on the device. Exemplary electronic devices with keys or a keypad may include, but are not limited to, a telephone, cellular phone, smartphone, personal digital assistant ("PDA"), laptop computer, netbook computer, tablet, pager, or any other device with a keyboard. The keypad structure and connecters that are described herein may be applicable to any device with keys or a keypad.

The keypad of an electronic device may include various buttons or inputs. Exemplary keypads include QWERTY, AZERTY, and Dvorak keyboard arrangements. There may be a complete alphanumeric keypad with buttons for each letter. Alternatively, multiple letters may be assigned to each button or the keypad may be a telephone-type keypad. Other exemplary buttons or inputs include select/enter, cancel, talk, play, stop, fast forward, rewind, next, previous buttons. Additionally, the device may have a number of navigation control buttons that may provide a number of functions such as a send or end key for a mobile telephone application of the device, a menu key, an escape key, etc. Internally, the device may include one or more circuit boards (not shown), a microprocessor, a memory, a battery, an antennae, etc., any of which may be coupled with the keypad and may form part of the keypad assembly.

The keypad assembly may include multiple components including a keypad portion with keys, a light guide, an electrical switch assembly or printed circuit board (PCB) and a casing. The electrical switch assembly may include a number of dome switches, such as one dome switch for each key in the keypad portion. In one example, the keypad portion may be a film-in-plastic ("FIP") or an in-mould-decoration ("IMD") keypad having a number of keys. In one example, the housing or casing may be a bezel frame having a single opening for the keypad portion. Alternatively, the housing may include a separate hole for each of the keys. The keys may each have a contact surface on the front side where a user may push down on a particular key and an actuator post connected to the back side of each key, such that when the user depresses the contact surface of a key, the actuator post of the respective key travels in the direction of actuation and contacts a respective dome switch thereby closing an electrical contact of the associated electrical dome switch allowing detection of the key depression.

Figure 1:
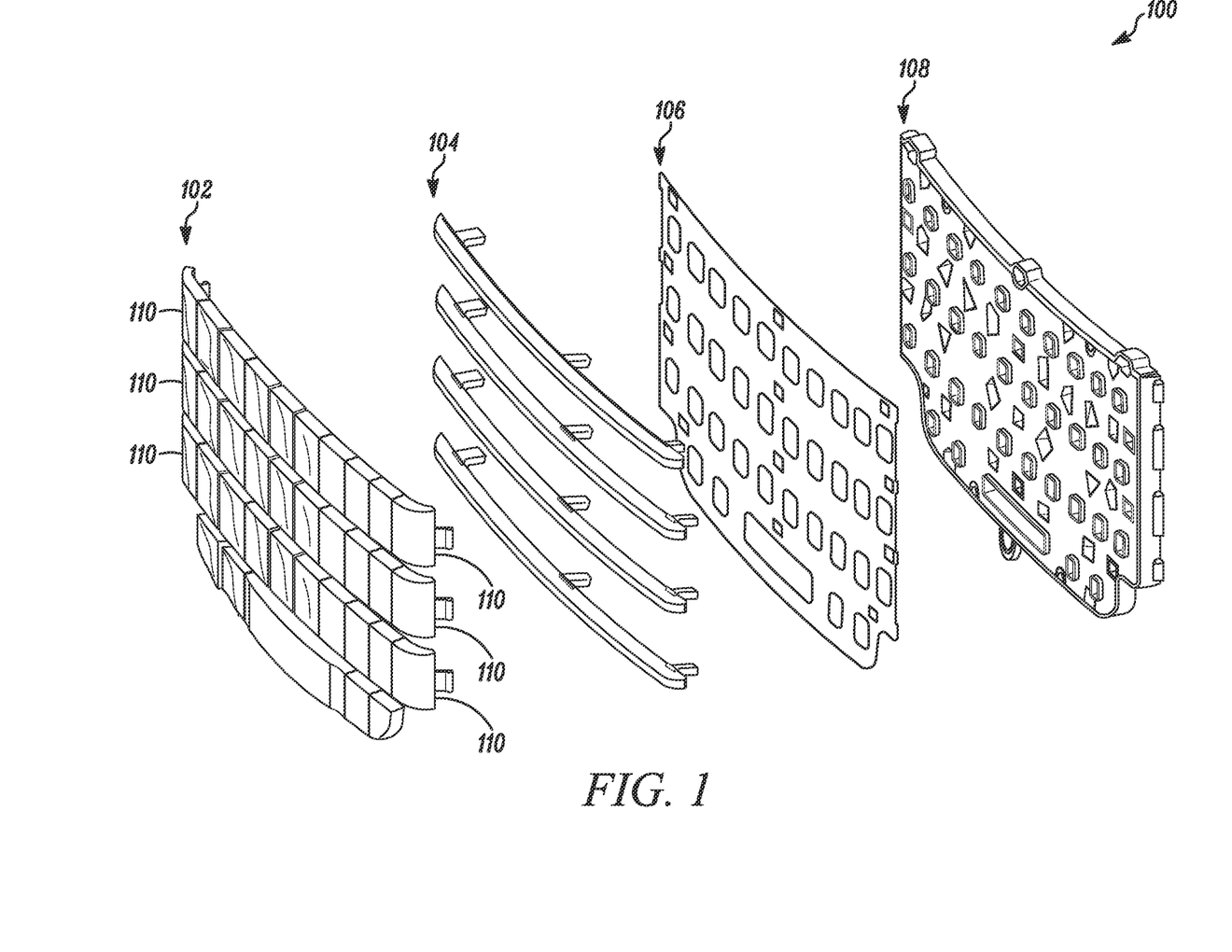
FIG. 1 illustrates one exemplary embodiment of the components in a keypad assembly.

FIG. 1 illustrates one exemplary embodiment of components in a keypad assembly 100. The keypad assembly 100 illustrated in FIG. 1 may be for a smartphone or a handheld electronic device. The keypad assembly 100 shown in FIG. 1 includes keypad keys 102 (also referred to as the keypad portion 102) coupled with a lightguide 108 using frets 104 and a mask sheet 106. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

In alternative embodiments, the keypad assembly 100 may include a keypad portion, keypad layer, a lightguide layer, a dome layer, a flexible printed circuit ("FPC") or printed circuit board layer ("PCB"), and/or a piezoelectric layer. The keypad layer may be a flat sheet which incorporates a film style keypad sheet. The film style keypad sheet may form an input keypad surface. The film style keypad sheet may be a continuous layer of flexible sheet material.

In one embodiment, the keypad assembly 100 may include a dome layer with an array of domes corresponding with the keys. Pressing of the keys may result in an actuation of a corresponding dome which is detected by the device. An FPC or PCB circuit layer may underlie the dome layer and include an array of contact pads or electrical switches that correspond to the keys and that detect the actuation of those keys. A circuit board may be an additional component of the keypad assembly 100, or may be part of one of the components, such as the lightguide 108 which may include or be coupled with the PCB.

As shown in FIG. 1, the keypad keys 102 may also be referred to as the keypad portion. Alternatively, the keypad keys 102 may be referred to as the keypad throughout this description for simplicity. The keypad keys 102 include a number of keys for physical actuation where each of the keys may have an actuator post attached to a back side of the key.

Figure 2:
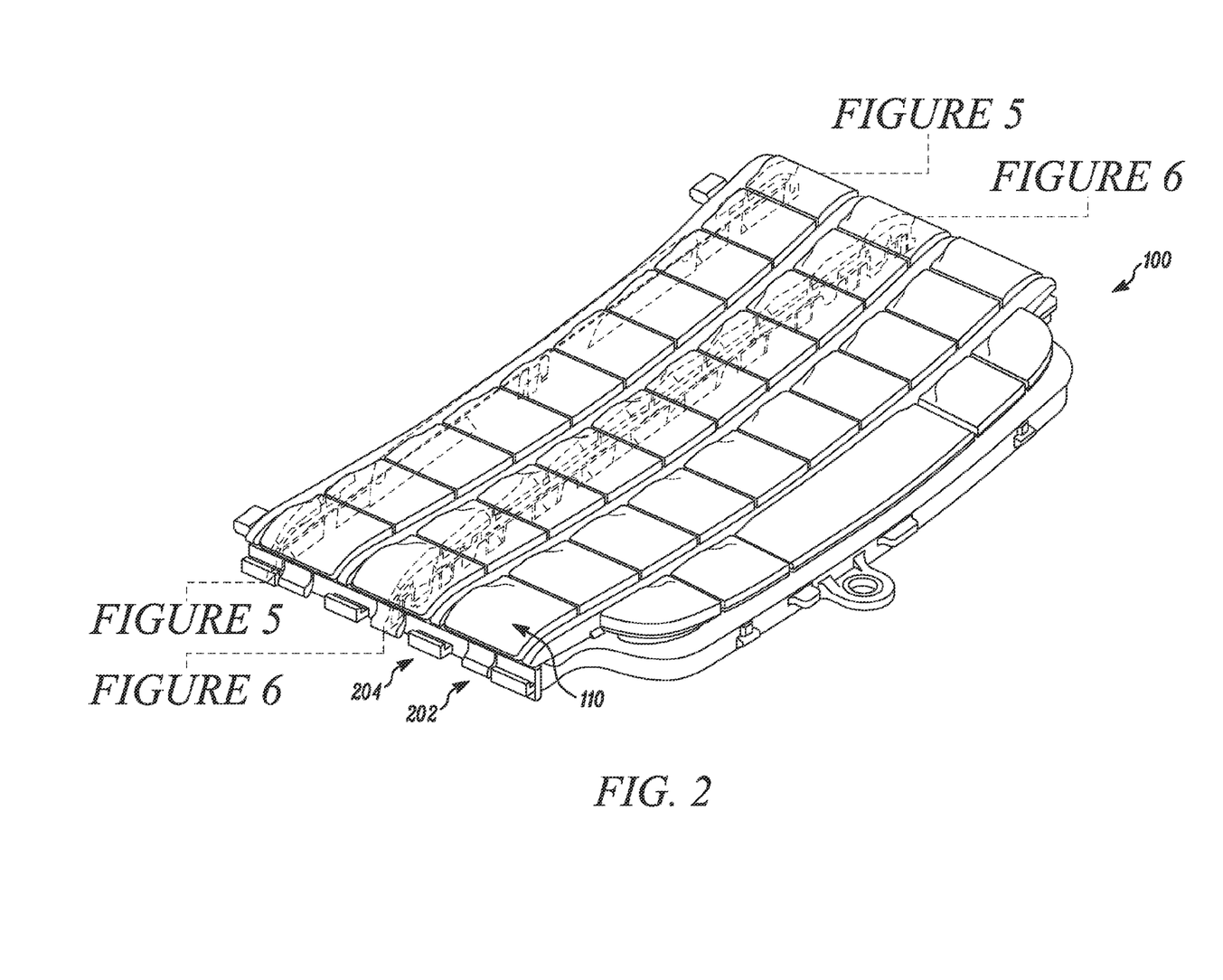
FIG. 2 illustrates an exemplary embodiment of the keypad assembly.
Figure 5:
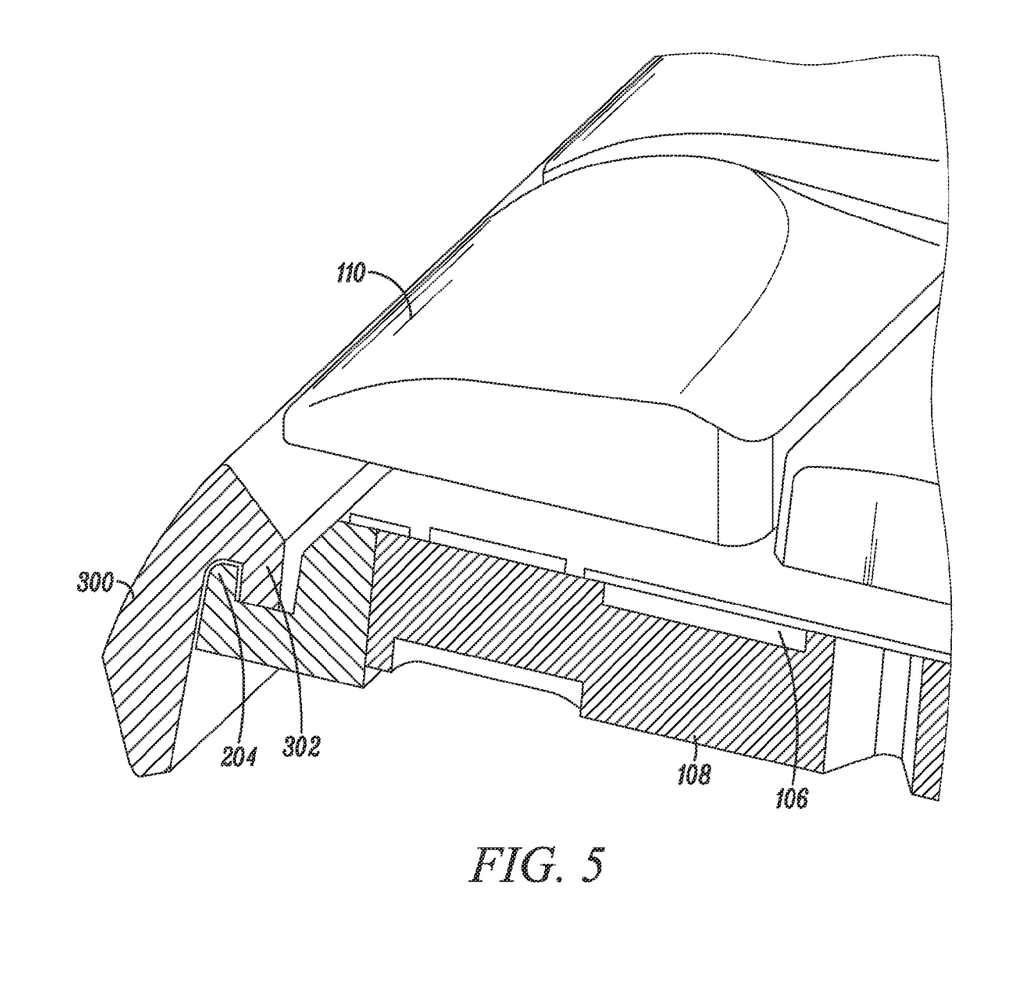
FIG. 5 illustrates a connection of the housing with the keypad.

The keypad keys 102 include two columns of edge keys 110 on opposite edges of the electronic device. The edge keys 110 are the keys located along opposite side edges of the electronic device. The embodiment shown illustrates that the edge keys 102 are curved, and specifically that the outermost edges of the edge keys are curved. Specifically, the edge key 102 curvature creates a rounded edge of the device as the keys are curved downwards towards the outside edge of the device (as shown in FIGS. 2 and 5, for example). In alternative embodiments, the edge keys 102 may not be curved and may be straight across to the edge of the device, or the edge keys 102 may include a different curvature than shown in this embodiment. The keypad frets 104 are coupled with the keypad keys 102 for maintaining the key arrangement; however it is appreciated that other embodiments without the frets may be possible. Likewise, the keypad mask sheet 106 provides openings for key actuations to be sensed.

The lightguide plate 108 may include or be coupled with a backlight for directing light to the keypad keys 102. The lightguide plate 108 may be a flexible flat film layer. The lightguide plate 108 may include micro-optical features which may help to disperse light through the lightguide plate 108. In one example, the lightguide plate 108 may allow the keypad to be backlit. The keypad assembly 100 may contain numbers, letters, or designs which may be seen more clearly when backlit. However, the lightguide plate 108 may be omitted and the keypad assembly may not be backlit or another means of lighting may be present. For example, the lightguiding feature may be incorporated into another layer or another component.

As shown in FIG. 1, the lightguide plate 108 may include a receiving portion for each of the keys from the keypad. There may be holes for each of the keys to connect with the keys. In one embodiment, the lightguide plate 108 top portion is rubber and receives the keys, which are glued into the corresponding portions of the plate. There may be additional components that are part of the keypad assembly into which the keys are coupled.

FIG. 2 illustrates an exemplary embodiment of the keypad assembly. In particular, FIG. 2 illustrates the keypad assembly 100 in an assembled form. In alternative embodiments, there may be more, fewer, or different components that comprise the keypad assembly. The cross-sections shown in FIG. 2 correspond to FIG. 5 and FIG. 6 as labeled. As described below, the keypad assembly 100 is combined with an exterior housing or casing.

FIG. 2 illustrates three edge keys 110. Each of the edge keys 110 includes a protruding portion 202 that is coupled with or part of the edge key for preventing the edge keys 110 from being removed or pried up from the keypad as further discussed with respect to FIG. 6. The protruding portion 202 may be referred to as a hook or locking mechanism. As described below, the protruding portion 202 is held by the housing or casing to prevent the key from being pried away from the keypad assembly 100.

Also shown in FIG. 2 are four hooks or lockings 204 that are part of the keypad assembly 100. The lockings 204 connect or interlock with corresponding hooks or lockings in the front housing as further discussed with respect to FIG. 5. The interlocking of the lockings 204 of the keypad assembly 100 with the housing may prevent bulging by limiting or preventing lateral movement between the keypad assembly 100 and the housing. Each of the protruding portions 202 may be located between the lockings 204, so the protruding portions 202 and the lockings 204 are spaced between one another on the edge of the keypad assembly 100. In alternative embodiments, there may be more or fewer lockings 204 for coupling with the housing and there may be more or fewer protruding portions 202.

Figure 3:
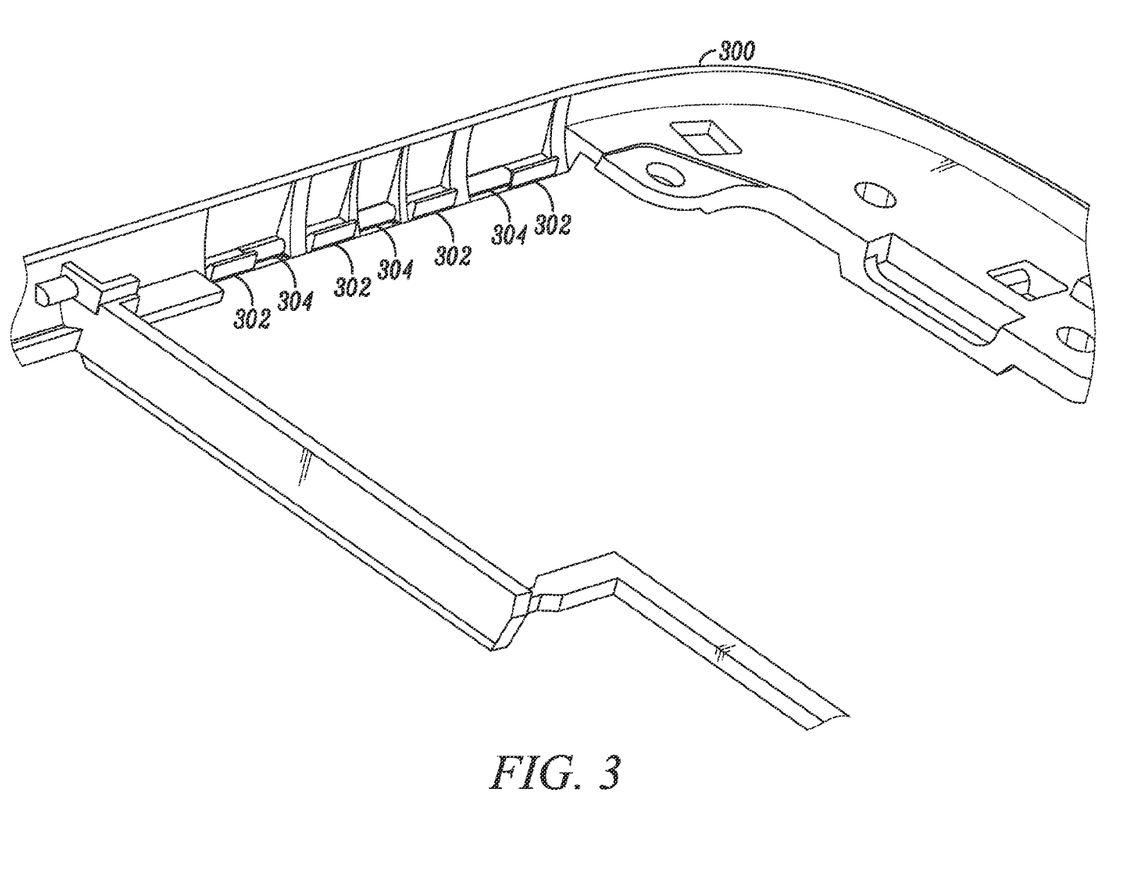
FIG. 3 illustrates an exemplary housing.

FIG. 3 illustrates an exemplary housing 300. The housing 300 may also be referred to as a casing or cover. In one embodiment, the housing 300 may be made of a plastic, composite, or metal. As illustrated in FIG. 3, the housing 300 is the front cover for the electronic device and is coupled with the keypad assembly 100. There may be a back housing or back cover (not shown) that is coupled with the front housing to enclose the electronic device. FIG. 3 illustrates a backside or underneath view of the front housing 300. In other words, the back of the electronic device is shown face up in FIG. 3 and the keypad would be on the front of the electronic device and facing down in FIG. 3.

Figure 6:
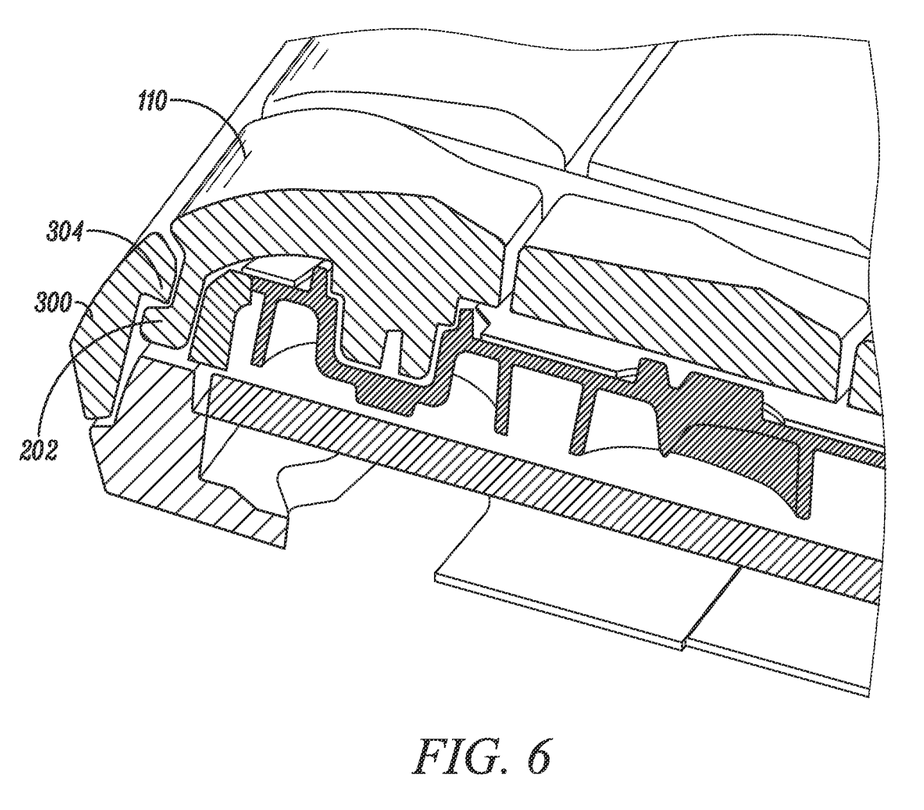
FIG. 6 illustrates a locking of the edge keys.

The housing 300 includes lockings 302 that interlock with the lockings 204 from the keypad assembly 100 shown in FIG. 2. The housing lockings 302 lock with the keypad lockings 204 to prevent lateral movement as illustrated in FIG. 5. Between respective lockings 302 in the housing 300 are gaps where the keypad protruding portions 202 from the keypad assembly can be located against or underneath a hook 304 when the housing 300 is attached to the keypad assembly. The hook 304 may be an overhang or a gap that is filled by the protruding portion 202 from the edge keys 110 to prevent the edge keys 110 from being removed vertically. The protruding portions 202 of the edge keys disposed within the gaps against the hooks 304 of the housing are illustrated in FIG. 6. In alternative embodiments, there may be more or fewer housing lockings 302 for coupling with the keyboard lockings 204, and there may be more or fewer gaps and hooks 304 corresponding with the protruding portions 202 of the keypad assembly.

Figure 4:
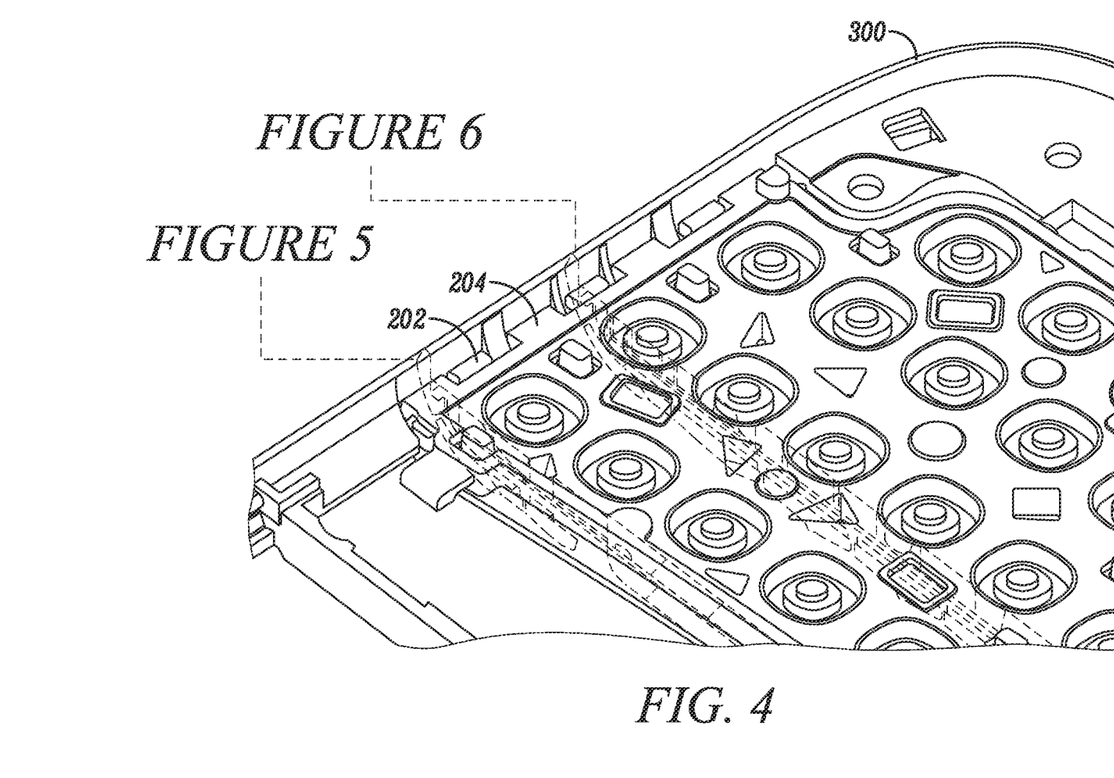
FIG. 4 illustrates a backside view of the keypad coupled with the housing.

FIG. 4 illustrates a backside view of the keypad coupled with the housing. In particular, FIG. 4 illustrates the front housing 300 coupled with the keypad assembly 100 where the backside or underside of the keypad assembly 100 (e.g. the lightguide 108 or back component of the keypad assembly) is visible. The keys of the keypad assembly 100 are on the other side of the electronic device and are not seen in the underneath view of FIG. 4. In some embodiments, a circuit board or PCB layer (not shown) of the electronic device may be located at the back of the keypad assembly in FIG. 4.

As shown in FIG. 4, the keypad assembly is coupled with the housing 300 by the keyboard lockings 204 which are connected with the respective housing lockings 302 in the housing 300. The housing lockings 302 are not visible in the backside view of FIG. 4. The protruding portions 202 from each of the edge keys 110 are connected with corresponding hooks 302 in the housing. The hashed cross-sections shown in FIG. 4 correspond to FIG. 5 and FIG. 6 as labeled. Compared with the cross-sections shown in FIG. 2 and the perspectives of FIGS. 5 and 6, the cross-sections shown in FIG. 4 are flipped because FIG. 4 illustrates a back side or under side view of the device while FIG. 2 illustrates a top view of the keypad assembly.

FIG. 5 illustrates a connection of the housing 300 with the keypad assembly. The lightguide 108 and the mask sheet 106 are also illustrated as part of the keypad assembly in FIG. 5. In alternative embodiments, the keypad assembly may include components other than the fret 104, the mask sheet 106, and the lightguide 108. As shown, the keypad assembly 100 includes an end portion that includes the locking 204. The end portion may be an extension of the keypad assembly. The housing 300 includes the housing locking 302 that matches with or interlocks with the keypad locking 204.

The interlocking of the housing locking 302 and the keypad locking 204 may prevent the housing 300 from bulging or widening up. In other words, the interlocking may keep the keypad assembly in a planar or flat orientation, such that the keypad does not bulge relative to the front plane of the device. The interlocking may prevent lateral movement between the housing 300 and the keypad assembly by keeping the housing 300 pulled in towards the center of the electronic device. In other words, the interlocking may maintain the shape of the housing 300 with respect to the keypad assembly 100. Further, the interlocking minimizes the space between the housing 300 and the keypad assembly so that the key protruding portions 202 can prevent the keys from being pulled or pried from the device as further discussed with respect to FIG. 6.

The locking 204 may be a part of or coupled with the keypad assembly 100 for interlocking with the housing 300. The locking 204 may be plastic molding that is attached to the keypad assembly or a part of one of the components of the keypad assembly. In one embodiment, the lightguide 108 or other components in the keypad assembly may be coupled with or may include the locking 204. For example, the lightguide 108 may be made of plastic that is extended outwards to include a plastic locking 204 on either edge.

FIG. 6 illustrates a locking for the edge keys 110. The edge keys 110 of the keypad assembly include the protruding portion 202 that prevents removal of the edge keys 110 and allows for the edge keys 110 to be disposed up to the edge of the device. The edge keys 110 may be disposed over the housing 300 such that the housing 300 is barely visible or not visible in a top view of the device. The housing 300 may include a gap area that is filled by the protruding portion 202 of the edge key 110. The gap area in the housing 300 includes a hook 304 above the gap that prevents the protruding portion 202 from being lifted above that hook 304. The edge key 110 may still be pushed downward for actuation, but the hook 304 limits upward movements of the edge key 110.

As illustrated, the protruding portion 202 may be rounded and extends in a lateral direction away from the center of the device such that the hooks 304 of the housing 300 extend over the protruding portion 202 to prevent vertical movement of the edge key 110. The protruding portion 202 may be an extension of the edge keys 110 and made of the same material as the edge keys. For example, the edge keys 110 may be a plastic or rubber material that includes a corresponding plastic or rubber protruding portion 202 for each edge key 110. In alternative embodiments, the protruding portion 202 may be a separate piece that is coupled with the edge key 110.

Because the interlocking of key locking 204 and housing lockings 302 discussed with respect to FIG. 5 prevents lateral movement of the housing away from the keypad assembly, the housing 300 is maintained against or close to the protruding portion 202 of the edge key 110. This prevents a gap from forming between the housing and the keypad assembly that may otherwise allow the edge key 110 to be removed if not secured with the protruding portion 202 against the housing hook 304. Because lateral movement between the housing and the keypad assembly is prevented or reduced, the protruding portion 202 prevents vertical movement of the edge key 110 since the protruding portion 202 cannot fit past the hook 304 of the housing.

The combination of the disclosed protruding portion and housing hook, as well as the key and housing lockings secure the keypad to the device. This securing mechanism prevents bulging and makes it difficult for a user to pry keys from the keypad. In addition to being secured together, this mechanism reduces the distance between component, including the distance between housing and keyboard, which may prevent dirt and/or moisture from entering the assembly. In addition, the curvature of the edge keys provides a smooth outer surface that fits comfortably into a user's hand.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. An electronic device comprising:
   a housing for enclosing at least a portion of the electronic device; and
   a keypad assembly coupled with the housing that comprises a plurality of keys for receiving inputs for the electronic device, wherein edge keys from the plurality of keys are disposed on an outside edge of the electronic device;
   wherein the keypad assembly comprises an exterior locking that corresponds with a locking in the housing to prevent lateral movement between the keypad assembly and the housing;
   wherein the edge keys comprise a protruding portion disposed underneath a hook of the housing to prevent removal of the edge keys.

2. The keypad assembly of claim 1 wherein the edge keys are curved downwardly towards the outside edge of the electronic device and the protruding portion extends downward from an outside edge of the edge keys.

3. The keypad assembly of claim 1 further comprising a circuit board having one or more electrical switches corresponding to the keys from the keypad.

4. The keypad assembly of claim 3 further comprising a lightguide plate located between the keypad and the circuit board and having a number of holes formed to correspond with keys from the keypad, wherein the holes provide paths for actuator posts of the keys to contact the corresponding electrical switch on the circuit board.

5. The keypad assembly of claim 4 wherein the exterior locking in the keypad assembly is part of the lightguide plate.

6. A keypad assembly comprising:
   a locking on an outside of the keypad assembly that couples with a corresponding locking on a casing to couple the keypad assembly to the casing; and one or more edge keys that include a protruding portion corresponding to a gap in the casing that limits vertical movement of the one or more edge keys relative to the casing;

wherein the gap in the casing comprises a casing hook that overhangs the protruding portion of the one or more keys.

7. The keypad assembly of claim 6 further comprising:
a keypad as part of an electronic device, wherein the one or more edge keys are keys on outside edges of the electronic device.

8. The keypad assembly of claim 7 wherein the one or more edge keys are curved downwardly towards the outside edges of the electronic device.

9. The keypad assembly of claim 7 further comprising a circuit board having one or more electrical switches corresponding to the keys from the keypad.

10. The keypad assembly of claim 9 further comprising a lightguide plate located between the keypad and the circuit board and having a number of holes formed to correspond with keys from the keypad, wherein the holes provide paths for actuator posts of the keys to contact the corresponding electrical switch on the circuit board.

11. The keypad assembly of claim 7 wherein the casing comprises a bezel frame located in a front of the keypad and defining an opening for the keypad.

12. The keypad assembly of claim 7 wherein the electronic device comprises a handheld computer or smartphone.

13. A keypad assembly system for a device that comprises:
a housing that frames a keypad for the device; and
a keypad assembly that includes the keypad and is coupled with the housing through lockings in the keypad assembly that interlock with corresponding lockings in the housing, wherein edge keys from the keypad include hooks that are coupled with corresponding hooks on the housing.

14. The keypad assembly of claim 13 wherein the lockings in the keypad assembly that interlock with the corresponding lockings in the housing limit lateral movement between the housing and keypad assembly.

15. The keypad assembly of claim 13 wherein the hooks on the housing overhang the corresponding keypad hook of the edge keys to prevent vertical movement of the edge keys, further wherein the keypad hooks comprise a protruding portion that extends underneath the housing overhang.

16. The keypad assembly of claim 15 wherein the edge keys are curved downwardly towards an outside edge of the device.

17. The keypad assembly of claim 13 wherein the keypad assembly further comprises:
at least one bezel coupled with the keypad;
a keypad frame through which the at least one bezel braces the keys from the keypad; and
a lightguide plate including holes corresponding to each of the keys from the keypad, wherein the at least one bezel connects with the lightguide plate and the keys from the keypad are coupled with the corresponding holes in the lightguide plate;
wherein the lockings in the keypad assembly are part of the lightguide plate.

18. The keypad assembly of claim 13 wherein the device comprises a handheld computer or smartphone.

* * * * *